United States Patent [19]
Ingold

[11] 4,013,042
[45] Mar. 22, 1977

[54] NET TENDING SYSTEM

[75] Inventor: Lester Donald Ingold, Federal Way, Wash.

[73] Assignee: Weyerhaeuser Company, Tacoma, Wash.

[22] Filed: June 2, 1975

[21] Appl. No.: 583,078

[52] U.S. Cl. .................................................. 119/3
[51] Int. Cl.² ..................................... A01K 63/00
[58] Field of Search .............. 43/7, 8, 14, 103, 104; 119/2, 3, 4; 294/66 R, 66 A, 77; 214/DIG. 1; 212/3; 220/85 A, 85 B, 8; 211/175, 176, 117, 118, 85; 210/449, 241, 242; 114/241, 240 E, 240 C; 254/137, 143; 141/313, 314, 319, 363, 364

[56] References Cited
UNITED STATES PATENTS

| 972,175 | 10/1910 | Evans | 119/2 |
|---|---|---|---|
| 3,127,692 | 4/1964 | Adleberg | 43/14 |
| 3,715,831 | 2/1973 | Mason | 43/8 |

*Primary Examiner*—Louis G. Mancene
*Assistant Examiner*—Peter K. Skiff

[57] ABSTRACT

A supporting apparatus for use in connection with suspending a flexible enclosure into a body of water for containing a valuable product is disclosed. The support is an elongated supporting rod, vertically adjustable in a mount secured to a platform, with the upper portion of the enclosure secured to the mount and the lowermost portion of the enclosure secured to the lower portion of the rod. A plurality of such supports is used to provide the stiffening members to ensure that the enclosure contains a constant volume. A method of exchanging enclosures such that the product remains below the surface of the water, thereby protected from harm or loss is also disclosed.

9 Claims, 8 Drawing Figures

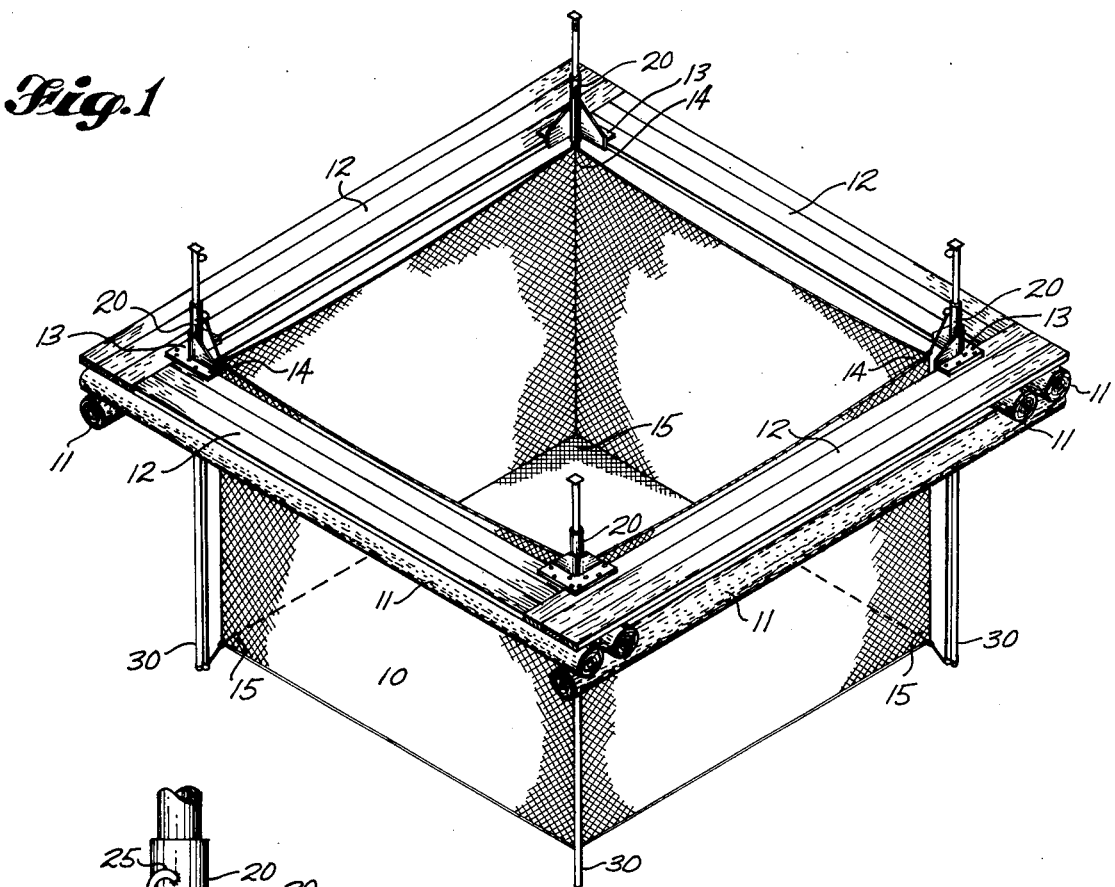
Fig. 1
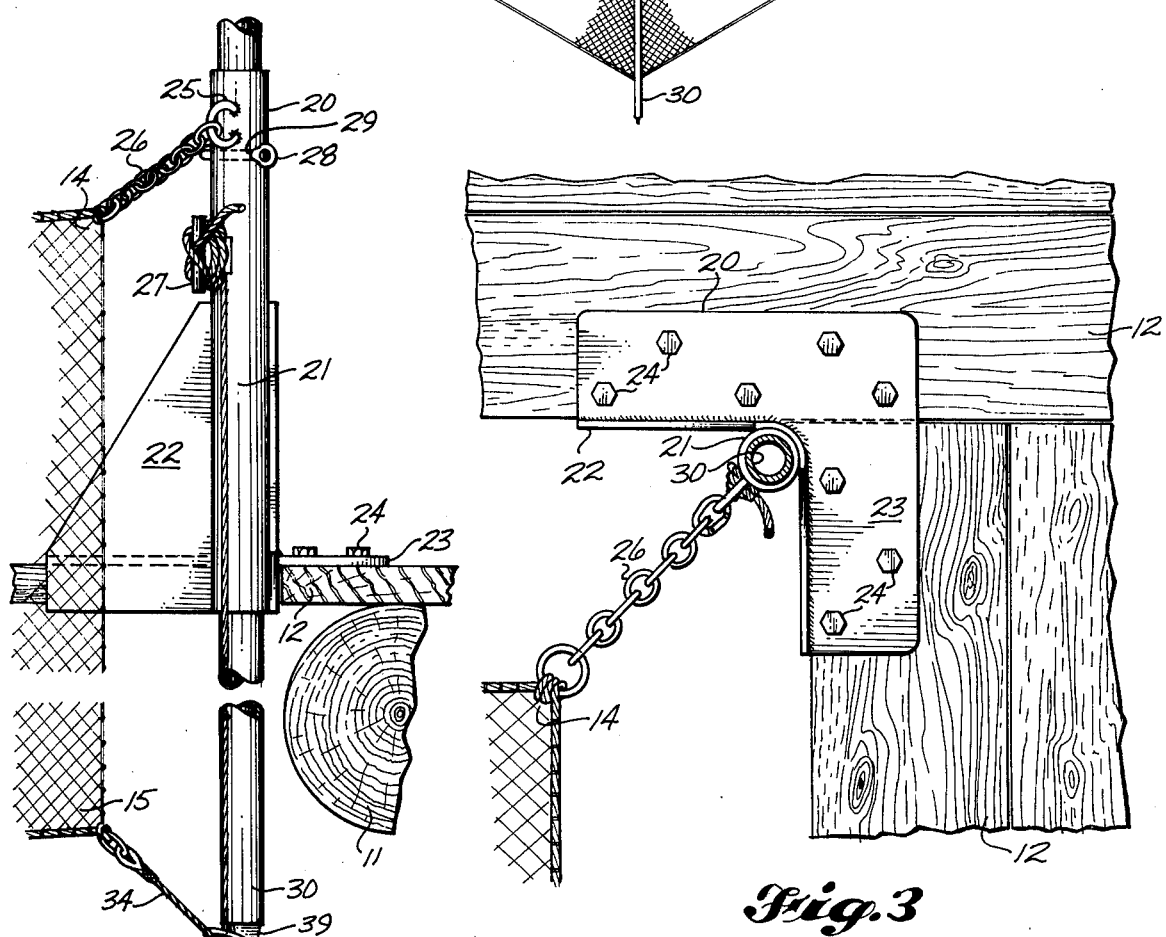
Fig. 2
Fig. 3

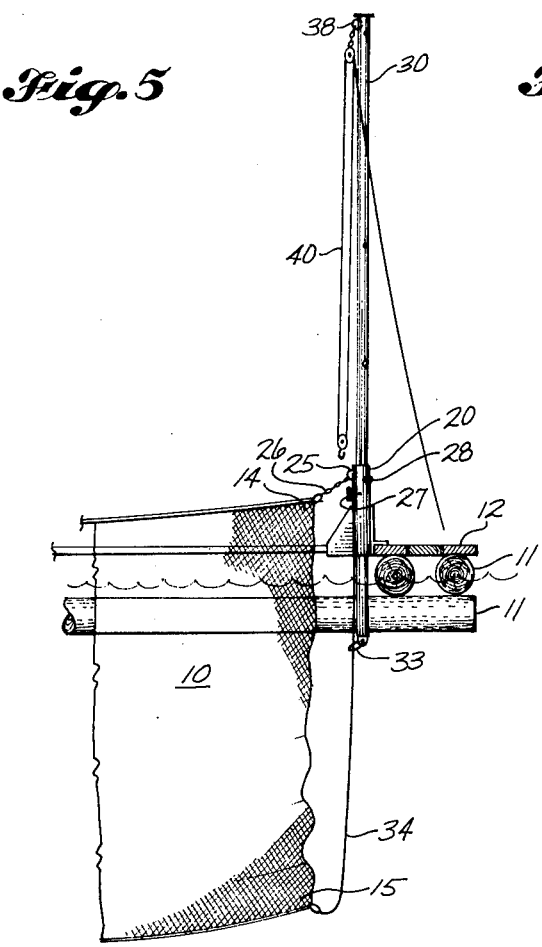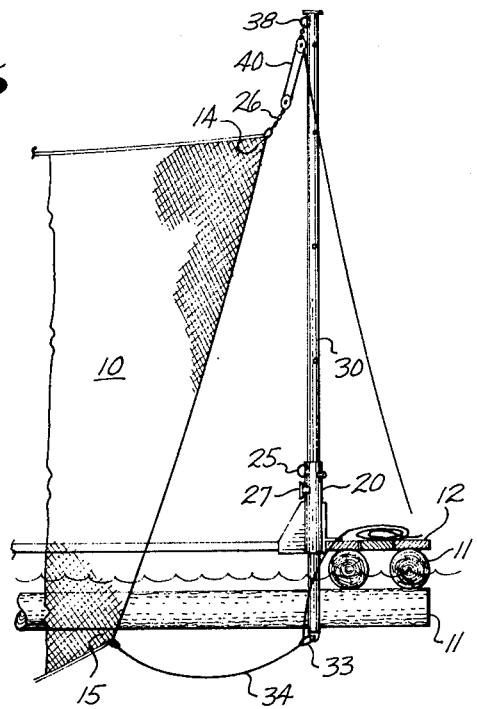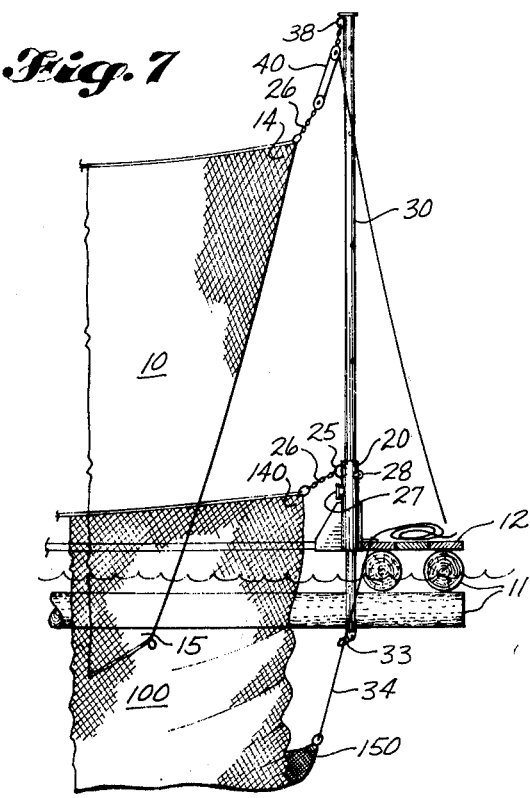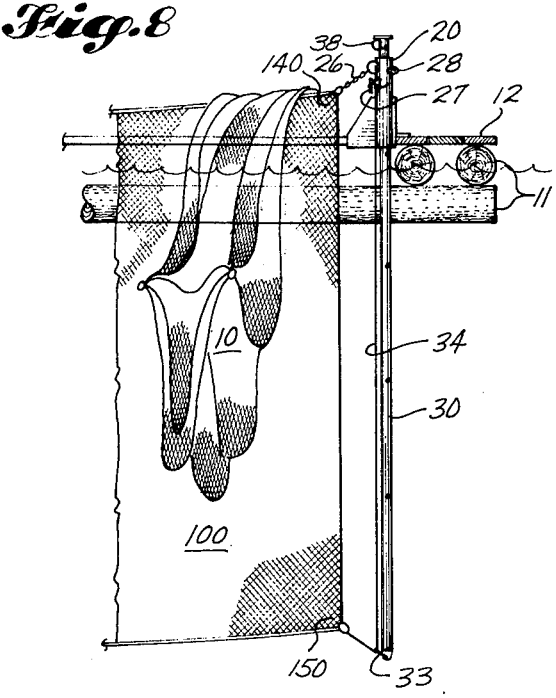

NET TENDING SYSTEM

BACKGROUND OF THE INVENTION

This invention pertains to an apparatus and method useful in the commercial growing of marine organisms.

There is a great interest in the world today in establishing new and controllable sources of protein for human needs. Marine organisms, of which fish are an example, are an important food source that man is seeking to domesticate and grow commercially. A commercialization approach which controls and confines the fish or other marine life for the major portion of their life span is most desirable in view of the pressures currently being placed on world fisheries. Also, having a reasonably predictable harvest is necessary to a viable commercial fish growing operation.

One approach to the commercialization of growing of marine organisms consists of holding and feeding young organisms until maturity or marketable size is reached. The confinement must be such that a proper environment is maintained in which the organisms can grow. Sufficient growing space, food, oxygen and waste disposal must be provided. Generally, the economics of commercial operations require that high population densities be maintained, which crowding creates difficulties in maintaining optimum growth rates.

This invention is concerned with the above-described commercialization method in which juvenile fish of a single species are introduced to a flexible net enclosure suspended into a body of water such that the fish are confined within a relatively constant volume of water. A natural or artificial current ensures a constant supply of oxygen and water-borne nutrients by the free passage of the water through the net sides and bottom of the enclosure. Food is introduced into the net pen from the surface while excess food and waste products are carried away by the currents. The fish are held in the pens until they reach maturity or marketable age, at which point they are harvested.

As expected, the economics of commercialization make desirable a high population density. The density of the fish within a given area is limited by the ability of the enclosure and its supporting systems to provide the necessities of space, food, oxygen, and waste removal within optimum growing ranges. The total fish population is limited by the ability of the operating unit to manage or physically handle the equipment and supplies.

The supporting apparatus of this invention provides stiffening members such that a net enclosure suspended from it maintains its intended shape below the surface of the water. A constant volume for enclosing the growing fish is therefore defined, eliminating any significant billowing or collapse caused by current movements through the net. The supporting apparatus thereby ensures that the design volume or confinement space is attained, allowing the highest possible total population therein.

During the long fish growing period, marine plants, such as seaweeds and algae, attach themselves to the net to the extent that flow through the pens is impeded. Eventually, the impediment due to marine growth is great enough to decrease the available oxygen supply to the fish and to prevent the currents from adequately removing waste products and uneaten food. Both the decrease in oxygen supply and inadequate waste removal must be taken into account in establishing permissible population densities, and operate to limit the economic viability of the commercial fish rearing operations. Fish, of course, must have available a certain specific amount of oxygen to sustain life. Failure of oxygen supply results in death or at least requires a reduction of the fish population to the level for which sufficient oxygen is available. Failure of the flushing currents to remove waste provides breeding grounds for harmful bacteria, threatening the population with disease, therefore further limiting population densities.

Elimination of the adverse effects of the marine growth problem without harm to the fish has generally involved some method of periodic cleaning of the net pens. Previously, this might require that divers scrub the net walls, either hydraulically or mechanically, to remove the marine organisms. Since the adverse effects from fouling begin to return as soon as one week after cleaning, in fertile tidal waters, this method has not proved satisfactory because of the expense and time consumption involved.

The supporting apparatus of this invention allows a method for rapidly exchanging clean nets for fouled enclosures while confining the fish population below the surface in a temporarily reduced volume, without loss of or harm to them. The method provides a simple exchange means which can be accomplished from the surface and which requires only a low labor input. Consequently, the exchange method may be utilized with the frequency necessary to eliminate the marine fouling limitation on population densities by ensuring a free flow of water through the selected enclosure. With the properly sized enclosures, the supporting apparatus allows the changing of nets by hand with only one or two individuals. Power equipment such as lifting devices and winches may be utilized in conjunction with the supporting apparatus-enclosure as the size of the system increases.

In its most basic form, the purpose of this invention is to define a supporting apparatus, a plurality of which forms a supporting structure for suspending a flexible enclosure into a body of water such that the enclosure defines a constant volume below the surface of the water such that a product contained within the enclosure is prevented from escaping. The supporting apparatus of the invention is so designed that the vertical depth of the enclosure is adjustable. Further, the supporting apparatus is so designed that the containment enclosures may be kept free of marine growth that interfere with the free passage of water by providing a method of exchange of clean nets for fouled enclosures without necessitating the prior removal of the fish population.

The supporting apparatus allows, in combination with a properly sized net, exchange of the net enclosures with a minimum of labor such that the exchange can be made frequently enough to maintain the free passage of waters through a clean enclosure as is necessary for optimum growing conditions.

BRIEF DESCRIPTION OF THE DRAWING

FIG. 1 is an isometric view of a net enclosure suspended by the apparatus of this invention from a floating platform.

FIG. 2 is an elevation view of the net tender stanchion and rod apparatus.

FIG. 3 is a plan view of the net tender stanchion and rod apparatus.

FIG. 5 is an elevation view showing the net tender rod fixed to the stanchion in an elevated position.

FIG. 6 is an elevation view showing the net enclosure raised such that only the bottom portion of the enclosure is submerged.

FIG. 7 is an elevation view demonstrating a step in a method for exchanging nets.

FIG. 8 is an elevation view showing a net as it is typically suspended from the rod and stanchion system, with an old net collapsed for removal from the water.

DESCRIPTION OF THE PREFERRED EMBODIMENT

Figure 4:
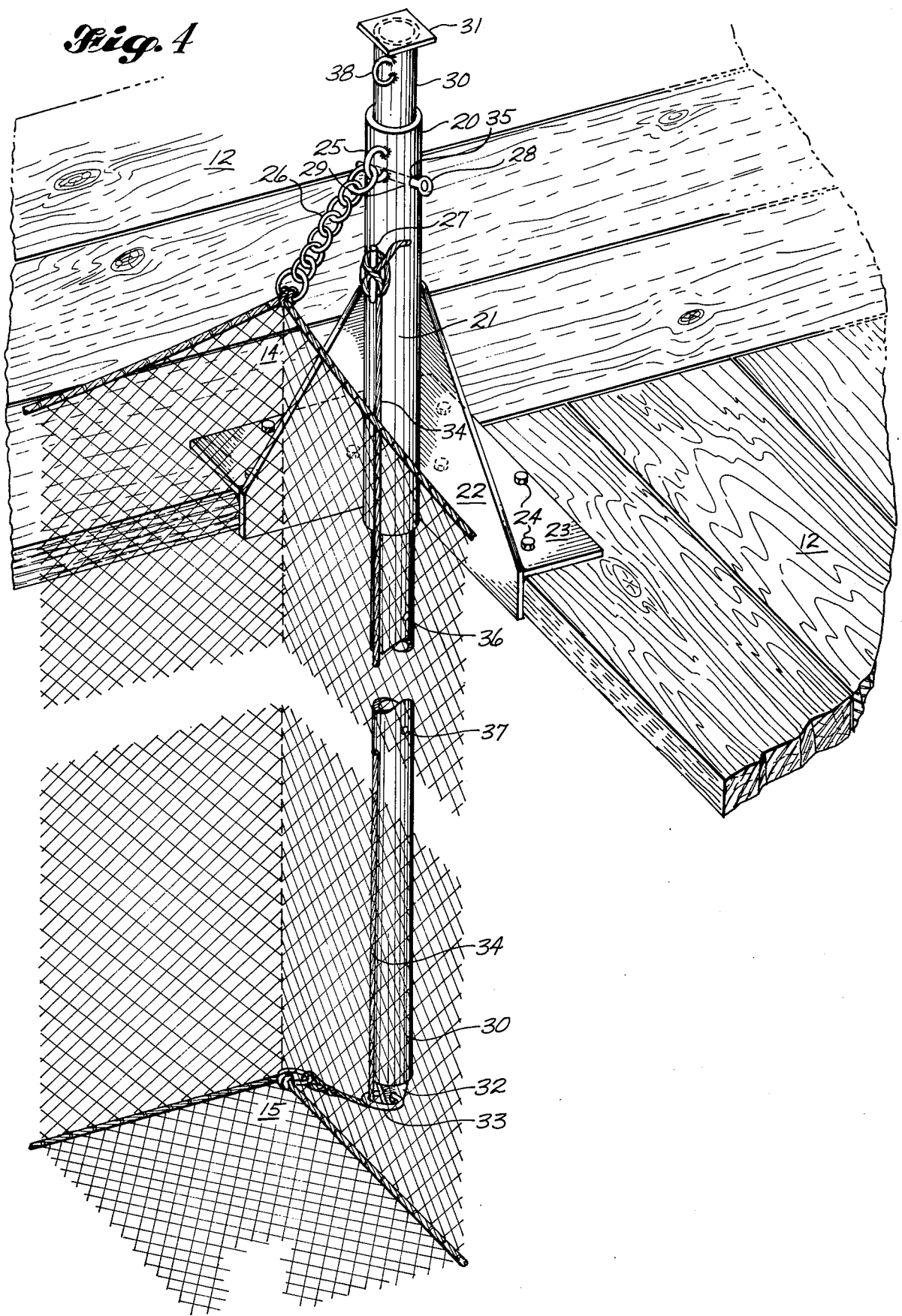
FIG. 4 is an isometric view of the suspension system securing one corner of a rectangular net enclosure in position.

Referring to FIG. 1, an isometric view of a typical installation of the net enclosure-suspension system is shown. A net enclosure 10 of rectangular cross-section is suspended from a supporting means, such as the log raft 11. Working areas, allowing access to the net pens, are provided by the decking 12. The net enclosure 10 is secured in position by attachment of each top corner 14 to a mounting means such as a net tender stanchion, generally indicated at 20, fastened to the decking as indicated at 13. Each net bottom corner 15 is secured to an elongated rod, such as a net tender rod 30, fixed into a vertical position in the stanchion 20.

Referring to FIGS. 2 and 3, the net tender stanchion 20 and rod 30 are shown in detailed elevation and plan views, respectively. The net tender stanchion 20 provides the supporting means for the net tender rod 30, consisting of a vertical sleeve in which the net tender rod is vertically adjustable. The stanchion sleeve 21, as shown, is constructed of a section of pipe supported by angle piece 22. A flange 23, attached to supporting angle 22, secures the stanchion to the decking 12 with suitable means such as the lag bolts 24. A fastening means, such as tie ring 25, allows the top portion of the net 14 to be secured to the stanchion through attachment line 26. An aperture at 29, through the stanchion sleeve, allows pin 28 to fix the sleeve-rod relationship.

The net tender rod 30, in FIG. 4, is vertically adjustable in relationship to the net tender stanchion 20. The rod as shown is constructed of a section of pipe or solid rod of such diameter that it is vertically adjustable within the stanchion sleeve 21. Holes 35, 36 and 37 are drilled through the rod 30 along its length. The rod 30 is secured into position with relationship to the stanchion by pin 28 inserted through aperture 29 and aperture 35 in the rod. A fitting 32 attached to the bottom end of the rod provides a support for a fastening means or tie ring 33. As shown in FIG. 4, the rod 30 is provided with an attachment ring 38 to prevent passage of the rod through the sleeve.

In operation, referring to FIG. 5, a net enclosure 10 is installed by attaching it to a plurality of stanchion-rod supports 30. The rod 30 at each support is initially in a raised position. The top position of the enclosure is attached to the stanchion 20 at tie ring 25. A line 34 attached to the bottom portion of the enclosure 10, as at 15, for example, is run through attachment fitting 33 on rod 30 and secured to cleat 27 on stanchion 20. The rod 30 is then fixed into its lowest position as shown in FIG. 8, holding the enclosure to the desired depth below the surface of the water.

In exchanging enclosures, the net tender rods 30, with a lifting device 40 attached to tie ring 38, are elevated and secured in an upper position as shown in FIG. 5. The lifting device 40 attached to the top portion of the enclosure 10 is then used as in FIG. 6 to raise the enclosure up such that its contents are compressed into a smaller volume but remain below the surface of the water. Line 34 is unsecured from the cleat 27, removed from fitting 33 and detached from enclosure 10 at 15. Referring to FIG. 7, a new enclosure 100 is attached at upper portion 140 to stanchion tie ring 25. Line 34 attached to the bottom portion of the enclosure at 150 is run through fitting 33 on the rod to the surface of the deck 12. In FIG. 8 the rod 30 is finally pinned at 28 into its lowest position in stanchion 20 such that it supports the enclosure rigidly below the surface of the water to the appropriate depth. Line 34 is tightened and secured to cleat 27. The old enclosure 10 is collapsed, which spills the remaining contents into the new enclosure 100. Old enclosure 10 is then removed.

The described suspension system may be adopted to flexible enclosures of any shape having walls and a bottom portion. Any number of stanchion-rod combinations sufficient to support a particular enclosure may be used.

The disclosed supporting apparatus may suspend the flexible enclosure from any fixed or floating position into any type of body of water. For example, the stanchion may be fixed to a dock-like structure anchored or otherwise attached to the bottom of the body of water. The net may be suspended into an artificial conduit, utilizing the containment walls for support for the stanchion-rod system. The body of water may be a natural system such as tidal areas or may be an artificial pond or even a large tank.

The size of the enclosure is determined by many factors including the cost of labor involved and ease with which the nets may be changed. Power assisted equipment, of course, would tend to allow larger pens to be maintained and is not inconsistent with this invention. For example, an overhead crane could be substituted for the block and tackle lifting means 40 shown in FIG. 5.

Other modifications will be evident to those skilled in the art.

What is claimed is:

1. A means for defining a fixed volume of water in which marine life is confined within a larger volume and below the surface of said water, comprising:
    a flexible enclosure means suitable for the care and propagation of marine life including side walls and a bottom wall formed from flexible porous materials allowing said water to pass through said walls;
    a plurality of supporting members extending vertically above and below said water surface,
    said supporting members being spaced horizontally from one another to expand and fixedly support the flexible enclosure means to substantially its maximum volume;
    upper connector means extending from the upper portion of said supporting members to the uppermost portion of said enclosure side walls to position the uppermost portion of said enclosure above surface;
    lower connector means extending from the lower portion of said supporting members to the lowermost portion of said enclosure to position the bottom wall a distance below said surface and to define the maximum volume of said enclosure; and a supporting frame, above and adjacent to said water surface, to which the supporting members are adjustably attached wherein said supporting frame supports the weight of the volume defining means and permits adjustments of its volume.

2. The volume defining means of claim 1 wherein said supporting members, comprise:
elongated rod means having a first fastening means located on said lower portion thereof for fastening said lower connector means to said rod means,
a second fastening means located on said upper portion thereof for fastening said upper connector means to said rod means,
the distance between said fastening means being greater than the length of said enclosure side walls; and
mounting means, fixed to said supporting frame, providing surfaces for adjustably supporting said rod means, wherein the volume of the enclosure below said water surface is adjustable while the substantially maximum volume of the flexible enclosure is maintained.

3. The volume defining means of claim 2 wherein said mounting means is provided with a third fastener to which the upper connector is attached and fourth fastener to which the lower connector is attached; and
said lower connector means extends from the lower portion of the enclosure through the first fastening means on said rod means to be secured above said surface to the fourth fastener on the mounting means, which arrangement allows the rod means to be adjusted in the mounting means to an elevated position with respect to the liquid surface without bearing the weight of said lower portion of said enclosure while substantially maintaining the substantially maximum volume of said flexible enclosure.

4. The volume defining means of claim 1 wherein said supporting frame floats upon the water surface and substantially surrounds said enclosure.

5. The volume defining means of claim 1 wherein said supporting frame is fixed to the bottom of said larger volume of water as a dock with piling means that supports said frame above the water surface.

6. The volume defining means of claim 1 wherein the larger water volume comprises a channel having opposing embankments and said supporting frame is provided by said embankments.

7. A method of transfering marine life from a first enclosure, attached to a supporting frame which supports said first enclosure so that the uppermost portion of the enclosure is just sufficiently above a water surface to contain said marine life, to a second enclosure without the loss of said marine life to the water outside of said enclosure, comprising the steps of:
reducing the volume beneath the water surface within said first enclosure by raising said first enclosure while the marine life remains in the reduced volume defined by the enclosure below said surface;
positioning said second enclosure beneath the raised first enclosure with the uppermost boundaries of said second enclosure located above said water surface and attached to said supporting frame; nd
lowering a portion of the uppermost boundaries of the first enclosure below said water surface but within the uppermost boundaries of said second enclosure thereby permitting said marine life to flow out of said enclosure into said second enclosure.

8. The method of claim 7, wherein said marine life is fish.

9. The method of claim 7, including: increasing the volume of said second enclosure below said surface by lowering said second enclosure until the uppermost portion of the second enclosure is just sufficiently above the surface to contain said marine life.

* * * * *